Sept. 22, 1953
J. J. SHORE
2,653,029
TOOL HANDLE
Filed Dec. 4, 1952
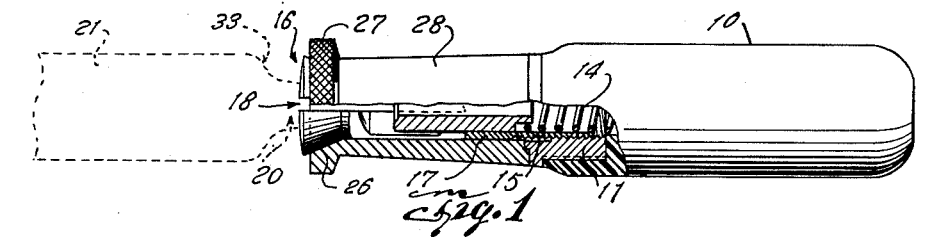
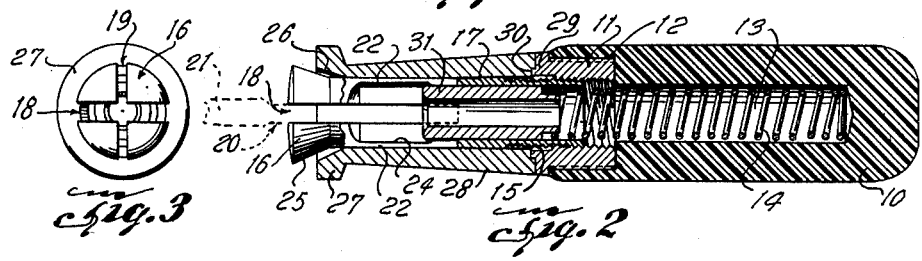
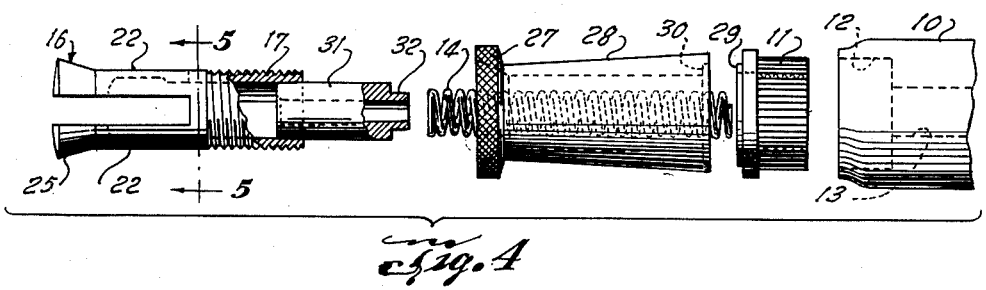
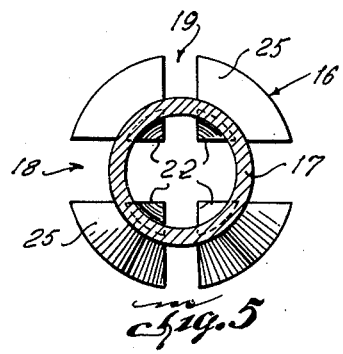
Jesse J. Shore
INVENTOR.
BY
ATTORNEY Patented Sept. 22, 1953

2,653,029

UNITED STATES PATENT OFFICE 2,653,029

TOOL HANDLE

Jesse J. Shore, Brownwood, Tex.

Application December 4, 1952, Serial No. 324,016

8 Claims. (Cl. 279—53)

1

This invention relates to handles for hand tools and more particularly to interchangeable handles for abrading, cutting, punching tools and the like.

The principal object of the invention is to provide a tool handle composed preferably of separable, axially aligned and threaded sections, one of which constitutes a gripping element while the companion section, which is exteriorly tapered, encases a contractible adaptor head having a shank threadedly engaging the gripping portion of the handle by which longitudinal movement of the shank is accomplished in the tapered portion of the handle to impose compressive force collectively on a plurality of segments of which the head is composed, by virtue of diametrical divisional slots made at relative right angles longitudinally through the head and shank.

Another object of the invention is to provide a tool handle in separable sections, including the segmental head with its compressible segments or jaws for clamping, for example, the tang of a file, by rotative movement of the hand grip section of the handle and in which the jaws of the clamping head are made resilient by an axial bore extending partially through the shank of the head. Moreover, to adapt the handle to tools having tangs of different lengths and widths, the invention includes a spring biased sleeve movable longitudinally within the bore of the shank of the head, said sleeve receiving the point of the tang and adapted to adjust itself longitudinally within the shank of the head according to the length and width of the tang against resistance of the spring disposed in an axial bore in the handle, thus to prohibit oscillative displacement of the tang within the handle which secures the tool against any displacement in relation to the handle.

Broadly, it is the aim of the invention to provide an efficient and interchangeable tool handle especially suited for files of different sizes and having a gripping head provided with contractible segments brought into compressive engagement with a portion of the tool by rotating a section of the handle and equipped with means to positively hold the tool against longitudinal or oscillative displacement in relation to the handle which is the annoying defect existing in most types of interchangeable tool handles.

With the foregoing objects in view, the invention has further reference to certain features of accomplishment which will become apparent as the description proceeds, taken in connection with the accompanying drawing wherein:

Figure 1 is a side elevational view of a tool

2 handle constructed according to the present invention having a portion broken away to show internal parts.

Figure 2 is a view in longitudinal section.

Figure 3 is a front and elevational view.

Figure 4 is a fragmentary exploded view with parts in section, and

Figure 5 is a transverse sectional view on line 5—5 of Figure 4.

Continuing with a more detailed description of the drawing, reference numeral 10 denotes a section of the handle constituting the hand grip and which may be formed of wood, metal, plastic or other suitable material. When the section 10 is made of a material other than metal, an annular insert 11 is press fitted into a counter-bore 12 in the end of the section 10, which counter-bore is considerably larger in diameter than the axial bore 13 which extends partially through the section 10 and forms a receptacle for a coil spring 14. The insert 11 is interiorly threaded but it will be observed in Figures 1 and 2 that the threads are relieved at a point spaced from one end of the insert 11 leaving a portion 15 devoid of threads. The purpose of this will become apparent presently.

A tool engaging head 16 has a shank 17 which is exteriorly threaded to engage the interior threads of the insert 11. Because of the unthreaded portion 15 of the insert, the shank 17 can actually be made longer than would be practical were it not for the unthreaded portion 15, that is to say, this feature reduces the number of turns of the handle section 10 necessary to draw the compression head into compressive engagement with the tool, as will become evident presently. Extending longitudinally through the head and partialy through its shank 17 are two diametrically opposed slots 18 and 19, the slot 18 being the greatest in width and adapted to receive the tang 20 of a tool such as a file 21. These slots divide the head and a part of the shank into segments or jaws 22 and to make these segments or jaws more resilient, an axial bore 24 is made in the shank 17, which bore extends to a point spaced inwardly from the head 16, the latter having a tapered portion 25 which is preferably at least one degree less than the tapered portion 26 provided in the end 27 of a tapered ferrule 28, which forms the companion section of the handle. The differential tapers 25 and 26 insure greater compressive force of the segments of the head against the tool with less friction than if these tapered surfaces were identical.

The ferrule 28 is freely movable on the shank 17 of the gripping head except when the head 16 is drawn into engagement with the end of the ferrule such as would be the case when a tool is clamped in the handle. To insure positive alignment between the ferrule 28 and the handle section 10 through the insert 11, the latter is provided with an annular shoulder 29 adapted to be received in the annular recess 30 formed in the adjacent end of the ferrule 28.

Arranged for free sliding movement in the bore of the shank 17 is an elongate sleeve 31. This sleeve has an end 32 of reduced diameter receivable in the end of the coil spring 14, the opposite end of the coil spring bearing against the end of the bore 13 in the handle section 10. It is evident, therefore, that the sleeve 31 may move freely in the bore of the shank 17 but the handle has been so designed that it will accommodate the tang of tools of all standard sizes without the sleeve being moved entirely out of the shank 17. This is important for the reason that the sleeve 31 would cease to perform its proper function of holding the tang of the tool against oscillative displacement if the sleeve were permitted to move out of the bore of the shank into the larger bore of the handle section 10. Even if the bore of the shank 17 and that of the handle section 10 were equal in diameter, smoothness of operation of the sleeve 31 would be impaired by the joint between the end of the shank 17 and the end of the bore 13 of the handle section 10, since it is preferred that at least a part of the sleeve 31 remain at all times in the bore of the shank 17.

In operation, the tang of a tool such as a file 21 is inserted in the slot 18 of the head 16 so that the point of the tang will enter the bore of the sleeve 31. The end of the tool 21 is placed against a solid surface while the handle is thrust forwardly so that the sleeve 31 would move inwardly of the handle the length of the tang. This action will bring the shoulders 33 of the tool 21 against the taper 26 of the ferrule 28. The handle section 10 is then rotated to draw the shank 17 inwardly, which action causes the jaws of the gripping head to simultaneously move inwardly by virtue of the engagement of the tapered surfaces 25 and 26, causing the segments of the head to be brought into compressive engagement with the tang of the tool 21 adjacent its shoulders 33. Thus, the tool is engaged and held at two points, one adjacent the end of the tang and another at the point where the tang joins the tool proper. The tool is, therefore, held against any tendency to oscillate while it is being used as well as being held against longitudinal displacement from the handle. To remove the handle from the tool, it is necessary only to rotate the handle section 10 in the opposite direction slightly whereupon the spring 14 will act to eject the tool from the head.

The knurled portion on the end 27 of the ferrule 28 enables the ferrule to be held by one hand while the handle section 10 is rotated with the other. This obviates the necessity for unduly handling the tool when the hands are grease covered which impairs the efficiency of a tool such as a file.

Manifestly, the construction as shown and described is capable of some modification and such modification as may be construed to fall within the scope and meaning of the appended claims is also considered to be within the spirit and intent of the invention.

What is claimed is:

1. A tool handle comprising a body in axially aligned and separable sections, one of said sections having an axial bore terminating short of one end, the companion section of said body having an axial bore in longitudinal alignment with the bore of the first body section and provided with an internal bevel at one end, a contractible tool head exteriorly tapered to correspond with the bevel in said companion body section and having a shank movable longitudinally in the bore of said companion body section and whose shank is threadedly receivable in the end of said first body section, said head and shank being divided into parallel segments by opposed diametrical slots therethrough, one of said slots being adapted to receive the tang of a tool, a sleeve arranged for free longitudinal displacement in said shank and adapted to receive the end of said tang, a coil spring in the bore of said first body section to resist inward movement of said sleeve by said tang and means for aligning said body sections one with the other.

2. A tool handle comprising axially aligned and separable sections, the first of said sections having an axial bore, the second of said sections also having an axial bore provided with a beveled outer end, a tapered and collapsible head for receiving the tang of a tool, a shank integral with said head, said shank having threaded engagement with said first handle section to hold the latter and said second handle section in assembled relationship and to effect longitudinal movement of said head and shank in relation to said handle to cause engagement between the taper of said head and the bevel of the bore of said second handle section to collapse said head onto a tool tang disposed therein, a sleeve movable freely in said shank for receiving and holding the end of said tang against oscillative displacement in said handle and spring means in said first handle section for urging said sleeve toward said second handle section.

3. A handle for receiving and holding the tang of a file or the like comprising a handle in axially aligned and separable sections, the first handle section having an axial bore in alignment with the axial bore of the second handle section, the latter bore having a beveled end, a tang receiving head having a tapered portion engageable with the bevel of the bore of said second handle section and separated into parallel segments by opposed diametrical slots for compressibility onto said tank by longitudinal displacement of said head into the bevel of the bore of said second handle section, a shank integral with said head and having threaded engagement with said first handle section for retraction of said shank and head into said second handle section, a sleeve movable freely in said shank for receiving and holding said tang against oscillative displacement with respect to said handle and spring means in the bore of said first handle section for biasing said sleeve.

4. A handle for receiving and holding the tang of a tool, comprising axially aligned sections, the first section having a longitudinal bore aligned with a longitudinal bore of the second of said sections, the bore of said second section having a beveled end, a head and shank divided into parallel segments by opposed diametrical slots for receiving said tang, said head being tapered for engagement with the beveled end of the bore of said second handle section upon retraction of said head and shank into said second section for collapsibility of said head segments onto said tang, said shank being threadedly engaged with said first handle section for retraction of said shank and head, a sleeve movable freely longitudinally in said shank for receiving and holding said tang against oscillative displacement in said handle and spring means in said first handle section for biasing said sleeve.

5. The structure of claim 4 in which an annular shoulder is formed on said first handle section for reception by an annular recess in said second handle section for maintaining positive axial alignment of said sections in their assembled relationship.

6. The structure of claim 4 in which the parallel segments of said head and shank are weakened for ready collapsibility by a longitudinal bore in said shank terminating short of said head.

7. The structure of claim 4 in which an annular, internally threaded insert in said first handle section constitutes the medium through which threaded engagement is effected between said handle sections through said threaded shank.

8. The structure of claim 7 in which the threads in said insert terminate short of the end thereof next adjacent the end of said second handle section to increase the degree of free movement of said shank within said handle sections.

JESSE J. SHORE.

References Cited in the file of this patent

UNITED STATES PATENTS

| Number | Name | Date |
|---|---|---|
| Re. 4,333 | Draper | Apr. 11, 1871 |
| 323,727 | Peavey | Aug. 4, 1885 |
| 769,725 | Britton | Sept. 13, 1904 |
| 1,453,117 | Anderson | Apr. 24, 1923 |